United States Patent
Cinquin et al.

(10) Patent No.: US 9,577,280 B2
(45) Date of Patent: Feb. 21, 2017

(54) BIOMIMETIC ARTIFICIAL MEMBRANE DEVICE

(75) Inventors: Philippe Cinquin, St Nazaire les Eymes (FR); Donald Martin, Killara (AU)

(73) Assignee: UNIVERSITE JOSEPH FOURIER—GRENOBLE 1, St. Martin D'Heres (FR)

( * ) Notice: Subject to any disclaimer, the term of this patent is extended or adjusted under 35 U.S.C. 154(b) by 104 days.

(21) Appl. No.: 12/667,022

(22) PCT Filed: Jun. 27, 2008

(86) PCT No.: PCT/EP2008/058253
§ 371 (c)(1),
(2), (4) Date: Dec. 28, 2009

(87) PCT Pub. No.: WO2009/003936
PCT Pub. Date: Jan. 8, 2009

(65) Prior Publication Data
US 2010/0178592 A1    Jul. 15, 2010

Related U.S. Application Data

(60) Provisional application No. 60/947,334, filed on Jun. 29, 2007.

(51) Int. Cl.
*H01M 8/02* (2016.01)
*H01M 8/10* (2016.01)
(Continued)

(52) U.S. Cl.
CPC .............. *H01M 8/106* (2013.01); *B01D 69/12* (2013.01); *B01D 69/144* (2013.01); *B01D 71/06* (2013.01); *H01M 8/1055* (2013.01); *H01M 8/16* (2013.01)

(58) Field of Classification Search
CPC ..................................................... H01M 8/106
(Continued)

(56) References Cited

U.S. PATENT DOCUMENTS 4,397,730 A * 8/1983 Bindra ........................... 204/252
6,500,571 B2 * 12/2002 Liberatore et al. ............... 429/2
(Continued)

FOREIGN PATENT DOCUMENTS

FR    2 881 481 B1    8/2006
FR    2 909 292 B1    6/2008
(Continued)

OTHER PUBLICATIONS

Martin, "The Significance of Biomimetic Membrane Nanobiotechnology to Biomedical Applications", Fundamental Biomedical Technologies, pp. 1-21, Dec. 26, 2007, XP-002515271.
(Continued)

*Primary Examiner* — Peter Keyworth
(74) *Attorney, Agent, or Firm* — Birch, Stewart, Kolasch & Birch, LLP

(57) ABSTRACT

The invention relates to a device comprising a casing and a biomimetic artificial membrane arranged within the casing to form two distinct chambers, wherein each chamber is provided for enclosing a liquid of a given composition, and wherein the biomimetic artificial membrane comprises a semi-permeable membrane for supporting a lipid membrane, the lipid membrane comprising a plurality of lipid molecules arranged in a layer and including at least a transport protein, the transport protein being adapted for transport of ions and/or molecules of the liquids between the two chambers.

10 Claims, 3 Drawing Sheets

(51) Int. Cl.
*B01D 69/12* (2006.01)
*B01D 69/14* (2006.01)
*B01D 71/06* (2006.01)
*H01M 8/16* (2006.01)

(58) Field of Classification Search
USPC .................................................. 429/401, 530
See application file for complete search history.

(56) References Cited

U.S. PATENT DOCUMENTS

| | | | |
|---|---|---|---|
| 7,045,171 B2 * | 5/2006 | Bookbinder et al. ....... | 427/407.2 |
| 7,704,630 B2 * | 4/2010 | Kouassi ........................ | 429/458 |
| 7,713,544 B2 * | 5/2010 | Chaikof ................... | C12N 1/00 |
| | | | 424/422 |
| 7,829,185 B2 * | 11/2010 | Cuppoletti ................. | 428/304.4 |
| 2004/0149688 A1 * | 8/2004 | Fuchs et al. ..................... | 216/56 |
| 2004/0191599 A1 | 9/2004 | Jackson et al. | |
| 2006/0154126 A1 | 7/2006 | Ritts et al. | |
| 2007/0048577 A1 * | 3/2007 | Ringeisen et al. .............. | 429/30 |
| 2007/0116610 A1 | 5/2007 | Cuppoletti | |
| 2008/0096094 A1 * | 4/2008 | Nakanishi ....................... | 429/44 |
| 2009/0068529 A1 * | 3/2009 | Martin et al. ................... | 429/33 |

2009/0120082 A1   5/2009  Lenouvel et al.

FOREIGN PATENT DOCUMENTS

| | | |
|---|---|---|
| WO | WO-2004/011600 A2 | 2/2004 |
| WO | WO-2005/022136 A1 | 3/2005 |
| WO | WO-2006/122566 A2 | 11/2006 |
| WO | WO-2007/033675 A1 | 3/2007 |

OTHER PUBLICATIONS

Kim et al., "An Electrochemical Interface for Integrated Biosensors", Proceedings of IEEE Sensors 2003. 2nd. IEEE International Conference on Sensors, Toronto Canada, Oct. 22, 2003 through Oct. 24, 2003. IEEE International Conference on Sensors, New York, New York, IEEE, US, Conf. 2, vol. 2, pp. 1036-1040, Oct. 22, 2003, XP010691066.

Anrather D. et al., "Supported Membrane Nanodevices", Journal of Nanoscience and Nanotechnology, American Scientific Publishers, US, vol. 4, No. 1/02, pp. 1-22, Jan. 1, 2004.

Bocking et al., "Biomimetic Membranes in Biosensor Applications", p. 127-166, XP02515271.

* cited by examiner

Na⁺/K⁺-ATPase (sodium pump)

Na⁺/H⁺ antiporter

Kir7.1 inwardly rectifying K⁺ channel

BIOMIMETIC ARTIFICIAL MEMBRANE DEVICE

This application is the National Phase of PCT/EP2008/058253 filed on Jun. 27, 2008, which claims priority under 35 U.S.C. 119(e) to U.S. Provisional Application No. 60/947,334 filed on Jun. 29, 2007, which is hereby expressly incorporated by reference into the present application.

FIELD OF THE INVENTION

The present invention relates to devices developed according to biological processes.

TECHNICAL BACKGROUND

Supply of sustainable energy is becoming an important issue that more and more people try to solve.

It is acknowledged that the fossil energies will not be sufficient for responding the increasing need of energy worldwide.

Some alternative solutions have thus been developed for replacing, or at least reinforcing, the current way of producing energy by more sustainable solutions.

Some developments have thus been focused on solutions such as hydropower, wind power or solar power. Such solutions are very encouraging as they enable production of significant amounts of energy, but they also have the limit of being very dependent on the climatic conditions. Further operating of these solutions is very expensive relative to the current fossil solutions, which are therefore predominant.

It has thus been proposed to focus on nanotechnologies as a path to new solutions.

It is acknowledged that harvesting energy from the chemical content of a living organism is an essential issue, in order to provide permanent energy supply to micro- or nano-systems designed to perform diagnostic or therapeutic actions, particularly in the case where failing organs have to be substituted.

It is therefore an object of the present invention to propose a new solution for addressing these energy problems. The invention more precisely aims at proposing a nanotechnology device for sustainable production of energy, potentially implantable inside a living organism.

SUMMARY OF THE INVENTION

In order to attain the above-mentioned object, the invention proposes a biomimetic membrane device as defined in the claims.

In particular, the invention relates to a device comprising a casing and a biomimetic artificial membrane arranged within the casing to form two distinct chambers, wherein each chamber is provided for enclosing a liquid of a given composition, and wherein the biomimetic artificial membrane comprises a semi-permeable membrane for supporting a lipid membrane, the lipid membrane comprising a plurality of lipid molecules arranged in a layer and including at least a transport protein, the transport protein being adapted for transport of ions and/or molecules of the liquids between the two chambers.

Preferable but not limited aspects of such a biomimetic membrane device are the following:
 the lipid membrane comprises a plurality of lipid molecules arranged in a bilayer;
 the transport protein is chosen among a $Na^+/K^+$ exchanger, a $Na^+/H^+$ exchanger, a $Na^+$/glucose transporter, a $HCO_3^-/Cl^-$ exchanger, an urea transporter, a passive glucose channel, aquaporin, a passive ion channel (like a Gramicidin A ion channel or a Valinomycin ion channel, or a more complex ion channel protein isolated from a living cell), a Cadmium transporter, bacteriorhodopsin, or combination thereof;
 the lipid membrane comprises two distinct transport proteins, or more than two;
 the biomimetic artificial membrane further comprises a polyelectrolyte membrane distinct transport proteins;
 the device further comprises electrodes arranged on both sides of the lipid membrane;
 the biomimetic artificial membrane comprises two lipid membranes and an electro-active-polymer membrane arranged between said two lipid membranes;
 the supporting membrane is permeable to any ions and/or molecules of the liquid compositions;
 the supporting membrane is a porous polymer, Silicon or graphene membrane;
 each chamber comprises an inlet for filling of the chamber with the liquid of the given composition;
 each chamber comprises an outlet for evacuating the liquid out of the chamber;
 both chambers comprise the same liquid with the same composition and with an identical concentration of ions and/or molecules;
 one of the chambers further comprises a substance adapted for activation of the transport of ions and/or molecules of the liquid compositions between the two chambers with the transport protein, said substance for activation being for example is adenosine triphosphate or any other drug and/or molecule known to anybody skilled in the art that can activate transport molecules;
 one of the chambers further comprises a substance adapted for inhibition of the transport of ions and/or molecules of the liquid compositions between the two chambers with the transport protein;
 one of the chambers further comprises an enzyme that acts on a substance whose transport is governed by characteristics of the transported molecules or ions, said enzyme being for example glucose oxidase and said substance being glucose;
 walls of the chambers are made of silicon, part of which being porous silicon;
 the chambers have a volume less than 1 $cm^3$;
 the membranes have a thickness less than 100 nm, and preferably less than 20 nm.

The invention also relates to a fuel cell comprising the above described device, wherein the device is adapted for creation of a gradient of pH, and wherein the fuel cell comprises means for transforming said gradient of pH into energy. For such a fuel cell, the device may comprise a biomimetic artificial membrane including a $Na^+/H^+$ transporter, and wherein the liquid comprises NaCl.

BRIEF DESCRIPTION OF THE DRAWINGS

Other characteristics and advantages of the invention will become clear from the following description which is only given for illustrative purposes and is in no way limitative and should be read with reference to the attached drawings on which.

DETAILED DESCRIPTION OF THE DRAWINGS

Biomimetic Membrane Device

The invention proposes to develop production of electrochemical energy by utilising an understanding of biological processes, and to develop corresponding nanostructured devices.

The invention is more precisely based on production of energy by creation of chemical gradients, as a result of transformation of chemical energy.

Ions and water channels are widely distributed in nature, and are very well known by biologists and biochemists. They are transport proteins whose production by genetic engineering techniques is well known. This production is however not always very easy because transmembrane proteins are difficult to produce and extract in significant quantities.

Biological membranes are also widely known; the typical biological membrane is a bilayer of lipids, usually a bilayer of phospholipids.

Methods to create biomimetic membranes, that is artificial membranes with a behaviour similar to the corresponding biological process, is well known. It may for example be referred to the work of Donald Martin published in a book entitled "Nanobiotechnology of Biomimetic Membranes" (Springer, NY, 2006—ISBN: 978-0-387-37738-4), which is herewith incorporated by reference in its entirety. Virtually any protein can be inserted in such biomimetic lipid membranes.

Figure 1:
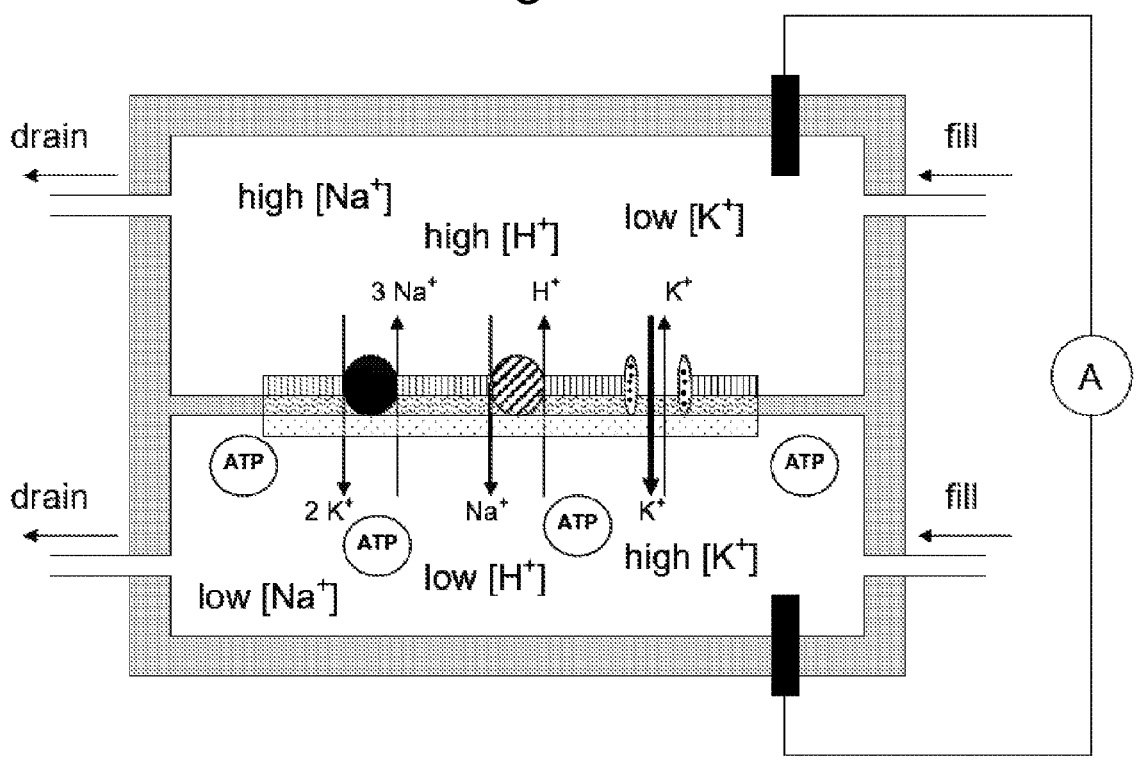
FIG. 1 illustrates the principle of a biomimetic membrane device of the invention.
Figure 1:
Figure 1:
Figure 1:
Figure 1:
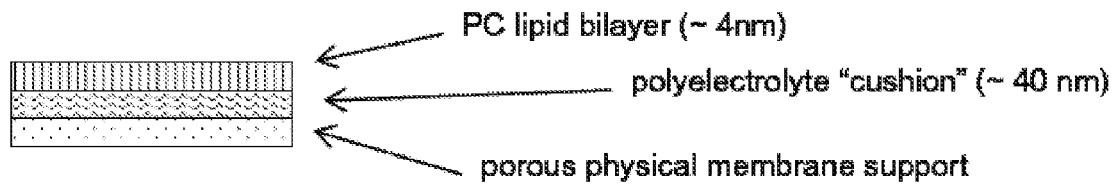
Figure 2:
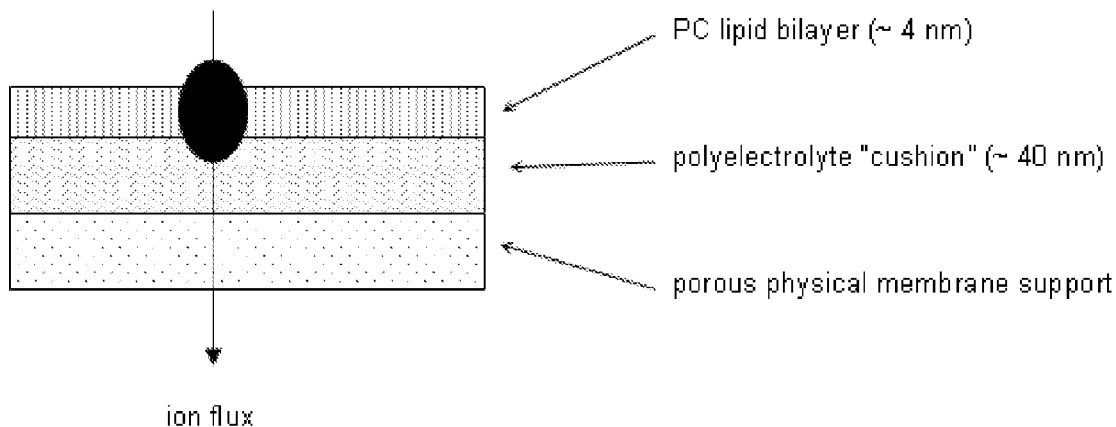
FIG. 2 illustrates a biomimetic artificial membrane of a device of the invention.

The biomimetic artificial membrane used in the device of the invention generally comprises three layers. Such composite membrane is illustrated in FIGS. 1 and 2. These layers are:
- a porous physical membrane support (called the supporting membrane), which is generally a polymer membrane (but which may also be a porous silicon membrane, or a graphene membrane), permeable to well-known classes of substances;
- a lipid membrane, generally made of phospholipids, which incorporates one or more transport proteins. The lipids are preferably arranged to form a bilayer of lipids. Such lipid bilayer membrane may be around 4 nm in thickness;
- a polyelectrolyte membrane, also called polyelectrolyte polymer "cushion", which is not always used. Such layer (typically around 40 nm in thickness) is interposed between the supporting layer and the lipid bilayer in order to maximise adhesion of the lipid bilayer whilst allowing lower viscosity and better lateral diffusion capability in the bottom-most part that contacts the supporting membrane.

Such membrane system enhances the existing semi-permeable membranes in a very significant way. Existing semi-permeable membranes rely on modifying the physical characteristics of the membranes in order to allow some degree of selective transport of particular molecules. For example, such modification can include a combination of surface charge ("wettability") and pore-size ("porosity") in addition to the choice of material for the membrane. However, this type of membrane is limited in being able to selectively control the permeability of ions and larger molecules that exist simultaneously in most complex "real" fluids (e.g. biological fluids, environmental fluids).

The advantage of the proposed biomimetic artificial membrane system is that the permeability of the artificial membrane system is controlled by using the specific transport proteins that exist in the lipid bilayer membranes of living cell-systems. Thus, the artificial membrane is provided with the ability to select the ion or molecule to be transported, in a similar way as occurs in living cell-systems. The bulk of the lipid bilayer provides the insulation for ions and molecules that are not permitted to be transported across the membrane by the incorporated biological transport molecules. Such selectivity can be imparted to the artificial membrane by "building" the artificial membrane from the tool-box of biological transport proteins that are extracted from living cells.

Among the different available biological transport proteins, we can cite in a non limitative way: $Na^+/K^+$ exchangers (also called $Na^+/K^+$-ATPase), $Na^+/H^+$ exchangers (also called $N^+/H^+$ antiporters), $Na^+$/glucose transporters, $HCO_3^-$/$Cl^-$ exchanger, urea transporters, passive glucose channels, aquaporin, passive ion channels (like Gramicidin A ion channel, Valinomycin ion channel, or other ion channel proteins isolated from a living cell), Cadmium transporters, or bacteriorhodopsin.

The biomimetic artificial membrane is enclosed in a casing, and is arranged in such a manner that two distinct chambers are provided. Both chambers are adapted for receiving a fluid in a manner that the only exchanges that the system allows between the two chambers may occur through the biomimetic chamber.

As illustrated in FIG. 1, both chambers may preferably be provided with an inlet and an outlet, for respectively filling and evacuating the chamber with and of a liquid with a particular composition.

Principle

FIG. 1 illustrates the principle of the biomimetic artificial membrane device of the invention.

There is provided a casing, which may be constructed as a diffusion chamber. As explained, the biomimetic membrane separates two fluid compartments, that is two distinct chambers that may be filled with a fluid.

The casing could be highly miniaturised if constructed from silicon wafer technology. Indeed, using silicon for the walls of the chambers, part of which being porous silicon, enables construction of a device with MEMS (Micro-Electro-Mechanical System) technology. This can lead to chambers of small volume (about 1 $cm^3$ or less), and to ultra-thin membranes (tens of nanometers).

In the illustrated example, the biomimetic membrane has a lipid bilayer comprising a $Na^+/K^+$ exchanger ($Na^+/K^+$-ATPase), a $Na^+/H^+$ exchanger ($Na^+/H^+$ antiporter), and an inwardly rectifying $K^+$ channel.

Initially both chambers contain the same solution of electrolytes (e.g. NaCl=150 mM, KCl=150 mM, pH=7.4) with the exception that the lower chamber contains adenosine triphosphate (ATP).

The primary active $Na^+/K^+$-ATPase utilises $P_i$ from ATP binding to actively transport $Na^+$ and $K^+$ ions. This active transport is electrogenic and establishes asymmetric gradients of $Na^+$ and $K^+$ ions across the membrane.

The secondary active $Na^+/H^+$ antiporter utilises the potential energy established by the $Na^+$ gradient to establish an asymmetric gradient of $H^+$ ions across the membrane.

The inwardly rectifying $K^+$ channel is necessary to allow a Nernst equilibrium for $K^+$ ions to establish across the membrane. Interestingly, this Nernst equilibrium will produce an electrical potential (e.g. 70-90 mV) that could also be useful for subsequent nanoelectronic applications of this biomimetic artificial membrane.

Such biomimetic artificial membrane device is capable of generating:
(i) current due to the electrogenic flux of ions,
(ii) an electrical potential across the membrane (e.g. 70-90 mV), and
(iii) significant osmotic pressures due to the asymmetric ion gradients,
(iv) purified liquid, since the concentration of the liquid in various solutes is modified across the membrane.

This principle could also be adapted for manufacturing biosensors.

Therefore the biomimetic membrane device of the invention allows creation of chemical gradients which could be used for several purposes, as it will be more apparent from the rest of the description.

Biomimetic Fuel Cells

The biomimetic membrane device may first be used as a source of electric energy.

There exists namely different ways of generating directly electrical energy from chemical gradients.

It has for example recently been proposed to use a fuel cell that works on a difference of pH. Such solution is more precisely described in the French patent application n°06-55296 filed on Dec. 4, 2006, which is herewith incorporated by reference in its entirety.

Other fuel cells may also be developed, such as glucose fuel cell where the source of power is glucose, and salt fuel cell where the source of power is NaCl.

The device may also be used as a source of mechanical energy.

In this case, the device may for example be used in a system which is based on gradients of osmolarity, as the one described in the French patent application n°05-50314 filed on Feb. 3, 2005, which is herewith incorporated by reference in its entirety.

The gradient may be that of a specific molecule (glucose, gluconate), or it may come from use of aquaporins ($H_2O$ transporters), in that case it is a global change of osmolarity that is created.

One can also refers to ion exchange resins and hydrogels, that react to changes (for instance in $Na^+$ or in $H^+$) by a change of volume.

The biomimetic membrane device may also be used for activating EAP (Electro-Active-Polymers) by creating a difference of voltage between the two faces of such devices.

Purification Mechanism

The biomimetic membrane device can also be used as a mechanism of purification.

In this case, the device may be a component of an artificial kidney (control of $Na^+$ transport).

The device may be used for control of urea (either directly, or through a mechanism similar to that of the various parts of the nephron).

It may further be used for control of water excretion (contribute to control of water balance), or water desalination.

Biomimetic Sensor

The biomimetic membrane device could be used as a sensing mechanism. Indeed, the creation of gradients of molecules creates a voltage that depends on the initial value of the molecule. This can be exploited to measure the concentration of the molecule.

A typical instance would be a glucose sensor. In this case, the transported protein could include SGLT ($Na^+$/glucose cotransporter), or a ligand-activated ion channel. The transporter would need to generate a flux of ions in response to binding of a ligand or co-transport of the detected molecule. The flux of ions would then be detected by standard electronics. The additional transport proteins, shown in FIG. 1, would be added to the principle outlined in FIG. 2 depending on the application and ion transport requirements.

The stoichiometry of the coupling between $Na^+$ and glucose transport is well-defined, which allows a sensitive bioelectric means of directly detecting glucose molecules. This stoichiometry depends on the particular protein. For example, SGLT1 transports 2 $Na^+$ ions with every glucose molecule, and SGLT2 transports 1 $Na^+$ ion with every glucose molecule, and SGLT3 transports 2 $Na^+$ ions with the binding of every glucose molecule. SGLT3 is an unusual member of the family of SGLT, because it does not actually transport glucose but does reliably transport $Na^+$ ions across the membrane. It is thought the SGLT3 is the biological glucose sensor for neuroendocrine cells.

An important characteristic is that the SGLT transport relies on an existing $Na^+$ gradient to transport glucose against its concentration gradient. If there is no glucose concentration gradient the SGLT will function as a uniport for $Na^+$ and generate a background electrogenic $Na^+$ transport.

There are several inhibitors in the literature including phloridzin, phloretin, phlorizin, p-nitrophenyl glucose, β-napthyl glucose, cadmium, isoquercitrin, spiraeosid, α-methyl-D-glucoside, and ANP.

Depending on the particular SGLT protein there are several substrates in the literature including fructose, D-glucose, D-mannose, galactose, α-methyl-D-glucopyranoside, α-methyl-D-glucose, methylazoxymthanol β-D-glucoside, 3-O-methyl glucose, 2-deoxy-D-glucose, Myo-inositol.

Figure 3:
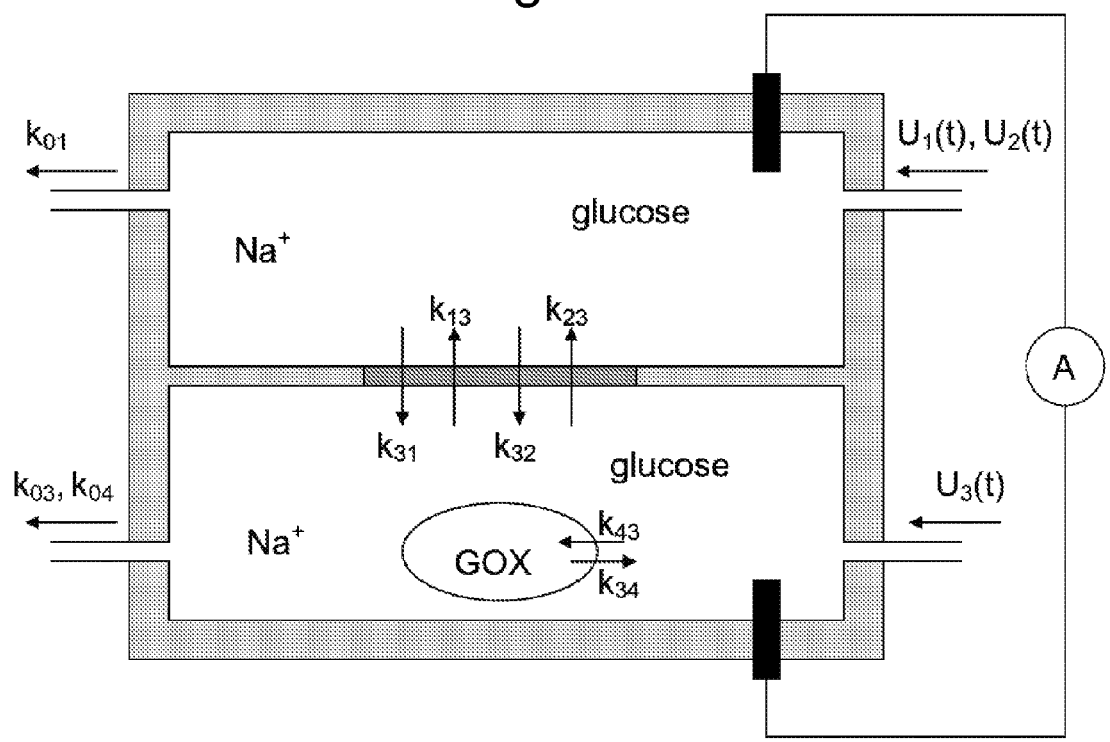
FIG. 3 illustrates a system for testing operation of a biomimetic glucose sensor.
Figure 4:
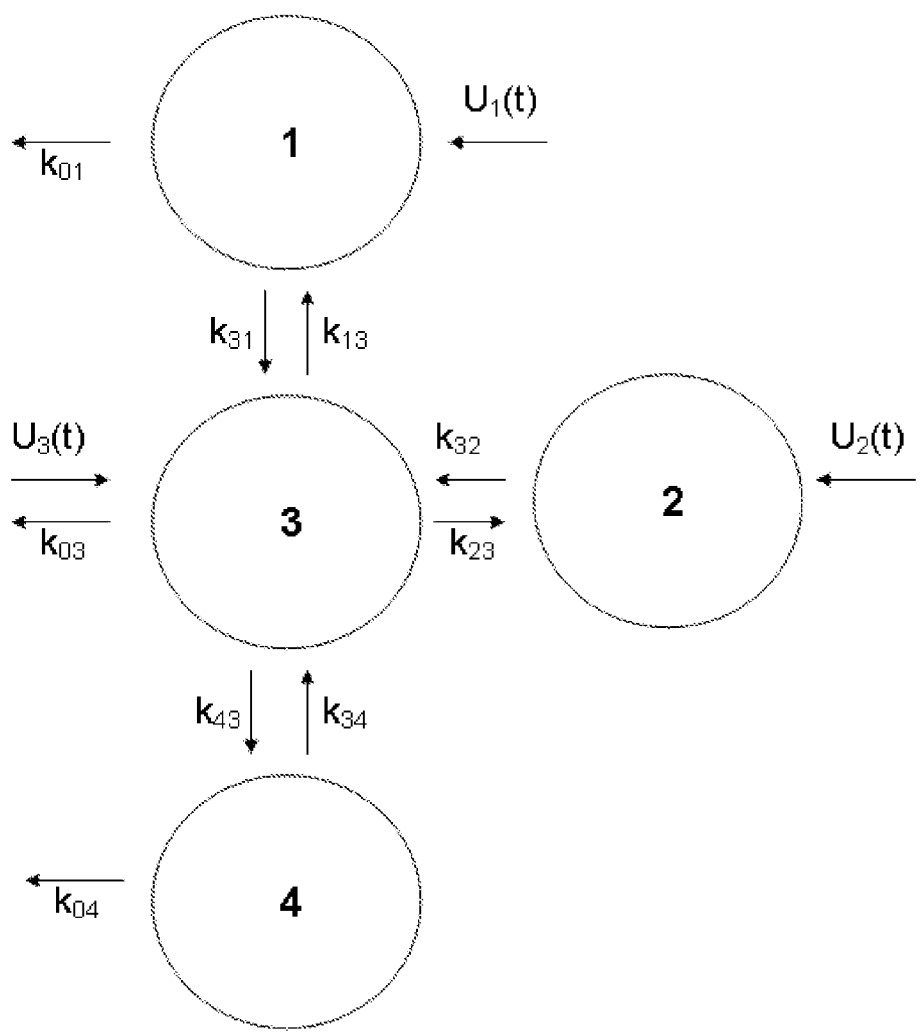
FIG. 4 is a diagram illustrating the general compartmental model corresponding to the physical system of FIG. 3.

FIG. 3 illustrates the physical system to conduct experiments on the operation of a biomimetic glucose biosensor, with the current measured by electrodes in the upper and lower chambers. The references used have the following meaning:

$U_1(t)$=input of $Na^+$ to upper chamber
$U_2(t)$=input of glucose to upper chamber
$U3(t)$=input of solution to lower chamber
$k_{01}$=outflow of solution from upper chamber
$k_{03}$=outflow of solution from lower chamber
$k_{04}$=outflow of products from glucose oxidase reaction
$k_{31}$=SGLT1 (forward) transport rate for $Na^+$
$k_{32}$=SGLT1 (forward) transport rate for glucose
$k_{13}$=SGLT1 (reverse) transport rate for $Na^+$
$k_{23}$=SGLT1 (reverse) transport rate for glucose
$k_{34}$=consumption of glucose by glucose oxidase
$k_{43}$=products of glucose oxidase reaction FIG. 4 is a diagram illustrating the general compartmental model corresponding to the physical system. In this diagram:

Compartment 1 represents the concentration of Na+ in the upper chamber
Compartment 2 represents the concentration of glucose in the upper chamber
Compartment 3 represents the concentration of the solution in the lower chamber
Compartment 4 represents the concentration of glucose oxidase in the lower chamber The general compartmental model can be described by the following linear set of differential equations:

$$\frac{dX_1}{dt} = k_{13}X_3 - (k_{31} + k_{01})X_1 + U_1(t) \quad (1)$$

$$\frac{dX_2}{dt} = k_{23}X_3 - (k_{32} + k_{02})X_2 + U_2(t) \quad (2)$$

$$\frac{dX_3}{dt} = k_{31}X_1 + k_{32}X_2 + k_{34}X_4 - (k_{13} + k_{23} + k_{03} - k_{43})X_3 + U_3 \quad (3)$$

$$\frac{dX_4}{dt} = k_{43}X_3 - (k_{34} + k_{04})X_4 \quad (4)$$

Another type of biosensor may be developed. The device may namely be used as a biomimetic light sensor where the transporter molecule will be bacteriorhodopsin. Incorporation of this transporter will produce a biomimetic artificial membrane system that responds to light in an analogous way to the retina. The bacteriorhodopsin will transport $H^+$ ions across the membrane in response to light. This flux of $H^+$ ions can be detected using a pH probe or other pH sensing mechanisms known to those skilled in the art, for example.

It is also possible to construct light-sensitive three-dimensional microcapsules. Such a system could provide a cutting-edge platform in which light is used as a switch to selectively control ion channel gating. For example an obvious application of such systems would be in drug delivery or controlled targeting, in which the hollow microspheres are used as the delivery agents and the ion channels functioning to facilitate the controlled release of the contents of the microparticles.

Since the microcapsules can be constructed with a diameter of 500 nm, an array of light-sensitive microcapsules can be attached to a flexible substrate to create for example an "artificial retina". This is an innovative approach to construct a light-sensitive material that is based firmly on the principles of nanobiotechnology. That is, biological principles are used in guiding and influencing the materials and processes that are developed from engineering and the physical sciences to create a novel microcapsule. Because the transduction of the light response by bacteriorhodopsin produces an electrochemical gradient due to changes in ion fluxes, the array of nanostructured microcapsules to create the "artificial retina" could be incorporated onto a flexible support such as an electroconductive polymer. Such polymer technology already exists. The electrochemical ion flux "readout" is appropriate for adapting to existing microchip technology. The outcome from such technology is a thin, flexible and light-sensitive membrane that provides the basis for photosensor devices (including an "artificial retina").

Density of Transport Proteins in the Biomimetic Artificial Membrane

It is a general requirement that the biomimetic artificial membrane has a global high ion conductance, in order to increase the performance of the device integrating such biomimetic membrane.

Theoretically the upper limit is probably around 1 transport molecule per 6 lipid molecules. However, that upper limit depends on how the individual transport proteins pack and assemble amongst the lipid molecules in the lipid bilayer, and is quite a complex theoretical calculation (depends on binding energies etc).

It appears from different experimentation that a typical operating upper range of density of transport proteins to lipid molecules is about $10^5$ lipid molecules for every 1 transport protein. This represents a density of transport proteins of about $10^9$ transport proteins per square centimeter when considering that there are $10^{14}$ lipid molecules per square centimeter in a typical lipid membrane.

The general principle for a proper operation of the device as a fuel cell is that there is a density of transport protein molecules is at least sufficient to achieve a measurable electrical current. Measurable currents can be as low as being in the pico-ampere range.

If the individual transport proteins have high ion conductance (i.e. individually low resistance pathways), then the density of transport protein molecules could be quite small to achieve a measurable electrical current.

For example, VDAC proteins (Voltage Dependent Anion-selective Channel) have a very high single-channel conductance of 4 nS. Therefore, the lower range of density of VDAC proteins to lipid molecules is $5*10^9$ lipid molecules for every 1 VDAC protein. This represents a density of ion channel proteins of $2*10^4$ ion channels per square centimeter.

If the individual transport proteins have low ion conductance, then the density will need to be greater to achieve a measurable electrical current.

This is for example the case of $Na^+/K^+$-ATPase transporter, which is an enzyme that produces a relatively low electrical current. Even so, with $6*10^{23}$ molecules per mole, there is still a small overall concentration of low-conductance transport proteins required to produce a measurable current in the device.

Specific Examples

The first series of examples relates to a device A comprising:
  a biomimetic membrane, containing at least one transport protein, which consists of:
    phospholipid molecules preferably arranged in a bilayer to mimic the form and chemical composition of naturally occurring lipid bilayer membranes found in living cells,
    a supporting polymer membrane for supporting the lipid bilayer membrane,
    the supporting polymer membrane being freely permeable to ions and molecules that are transported by the transport proteins contained in the lipid bilayer membrane,
  two compartments separated by the membrane
    initially the two compartments are filled with liquid compositions with similar concentrations of all molecules or ions,
    one of the compartments may be the Extra Cellular Fluid.

In example A1, there is provided a biomimetic membrane device A comprising a single transporter which is $Na^+/K^+$ exchanger (ATP dependant).

This results in $Na^+$ gradients, useful for their mechanical effect, or as a purification system (artificial kidney).

The mechanical effect is made possible through osmotic effect, since 3 $Na^+$ are exchanged for 2 $K^+$. As an example, with fluids in the chambers with a concentration of NaCl of 125 millimoles/L, an osmotic gradient of 40 milliOsmoles/L could be established across the lipid membrane by the operation of the $Na^+/K^+$ exchanger, which corresponds to a pressure of 1 atmosphere. If there is sufficient ATP then the pump will continue to operate and the Na+ will be eliminated from one side of the membrane.

From consideration of the properties of the $Na^+/K^+$ exchanger to establish an electrochemical gradient of 125 millimoles/L of Na+ across the membrane, the resulting electrical potential could be 63 millivolts.

The mechanical effect is also made possible through swelling of ion exchange resins or of hydrogels.

In example A2, there is provided a biomimetic membrane device A comprising a single transporter which is $HCO_3^-$/$Cl^-$ exchanger.

Such device leads to a gradient of $H^+$, provided that any enzymatic system (urease, for instance) or biological system (e.g. yeast) produces $CO_2$. One could also consider elimination of $CO_2$ on the other side from breathing.

In example A3, there is provided a biomimetic membrane device A comprising a single transporter which is a $Na^+$/$H^+$ exchanger. One compartment (Comp1)) contains glucose oxidase, while the second compartment (Comp2) contains urease. Both compartments initially contain water, NaCl, glucose and urea.

Work of the enzymes produces $H^+$ in Comp1 and $OH^-$ in Comp2. Exchange between $Na^+$ and $H^+$ statistically occurs much more in the direction of concentrating $Na^+$ in Comp1. Indeed, after some time a steady-state will be reached where the $Na^+$/$H^+$ exchanger will transport $H^+$ ions from Comp1 to Comp2 in exchange for transporting $Na^+$ ions from Comp2 to Comp1. This results in $Na^+$ ions being concentrated in Comp1 and $H^+$ ions concentrated in Comp2.

Such a device creates significant gradients in $Na^+$, useful for mechanical power generation (through osmosis, ion exchanging resins or hydrogels), or for liquid purification.

From the device A3, a salt fuel cell may be created, wherein NaCl is the source of power. A membrane is functionalized with $Na^+$/H+ exchanger. Pure water is initially on both sides of the membrane. NaCl is progressively introduced on one side. This creates a gradient of $Na^+$, that activates the exchange with $H^+$. A gradient of $H^+$ is then created. This gradient is exploited in a pH dependant fuel cell for example. Virtually any $H^+$ corresponds to an electron.

Such device could be operated outside the human body, by progressively dissolving NaCl. The advantage over the glucose fuel cell (described in French patent application n°06-55296 filed on Dec. 4, 2006) is that no enzyme is required, that salt is more soluble than glucose, and that its molecular weight is lower. Hence, the power to mass ratio could be much better than that of a glucose fuel cell. Each mole of NaCl could produce one mole of electron. If it is assumed operation under 5 units of gradient of pH, with a pH dependant fuel cell where one electron is exchanged for each produced $H^+$, this means 5*60=300 mV, and therefore a maximal theoretical power to mass of the fuel of 96500*0.3/58 J/g=500 J/g (to be compared with best batteries, that are able to provide 160 Wh/kg=576 J/g). It has however to take also into account the weight of the water.

If used inside the human body, it is no longer needed to produce ATP, but gradients of $Na^+$.

In example A4, there is provided a biomimetic membrane device A comprising a single transporter which is a passive glucose channel. This may be used in conjunction with the device described in the French patent application n°06-55296 filed on Dec. 4, 2006, where one of the compartments is the Extra Cellular Fluid (ECF), and the second compartment contains glucose oxidase that is used to decrease pH from the glucose passing from ECF to the second compartment. In such situation, the difficult issue is the presence in the ECF of chemical buffers, such as HCO3–. With the biomimetic membrane of A4, glucose oxidase will work "protected from buffer", since no $HCO_3^-$ will be able to get through the membrane from ECF to the second compartment.

This can be interesting either for facilitating decrease of the pH, or for an osmotic effect due to the trapping of glucose under the form of gluconate.

When adding electrodes to measure the potential on each side of the surface of the lipid bilayer, it is possible to adapt all the devices A of the first series, to devices B corresponding to the second series of test, where the device are used for voltage measurements, or as biosensors.

In the third series of example, there is provided a device C similar to A, where two transporters are used.

In example C1, there is provided a biomimetic membrane device C comprising a $Na^+$/$K^+$ exchanger (ATP dependant) and a $Na^+$/$H^+$ exchanger.

This creates gradients of $H^+$, that can be used for the pH dependant fuel cell.

In example C2, there is provided a biomimetic membrane device C comprising a $Na^+$/$K^+$ exchanger (ATP dependant) and a $HCO_3^-$/$Cl^-$ exchanger.

This can be used to purify salty water.

In example C3, there is provided a biomimetic membrane device C comprising a $Na^+$/$K^+$ exchanger (ATP dependant) and a SGLTx ($Na^+$/glucose exchanger).

This could be interesting for use as a fuel cell or for eliminating the glucose. For the latter, the compartment where glucose is transported contains a glucose oxidase. This however implies elimination of the produced gluconate through a valve (the power driving this elimination could be osmotic power, since gluconate gets "trapped")

In example C4, there is provided a biomimetic membrane device A comprising a urea transporter and a $Na^+$/$K^+$ transporter. The latter creates a $Na^+$ gradient, that is then used by the former to concentrate urea. Alternatively, one could use glucose oxidase to decrease pH in one compartment, and then a combination of $Na^+$/$H^+$ and urea transporter to concentrate urea.

This system may be used for management urea excretion. This could more precisely be used in an implantable artificial kidney.

In the fourth series of example, there is provided a device D which combines the characteristics of the device B (voltage measurement) and the device C (two transporters).

For example, for the corresponding glucose sensor, a steady-state $Na^+$ gradient is established across the membrane by the action of the $Na^+$/$K^+$ exchanger, with $Na^+$ ions concentrated on one side of the membrane.

The binding of one glucose molecule to the SGLTx transporter binds a glucose molecule and the lead to conformational change in the SGLTx transporter whereby both the glucose molecule and two Na+ ions is transported across the membrane.

Electrodes across the membrane detect the change in voltage or current caused by the transport of the 2 $Na^+$ ions across the membrane.

The sensor functions by detecting a change in the steady-state voltage of current that is caused by the co-transport of glucose molecules and $Na^+$ ions across the membrane by the SGLTx transporter.

A "bridge-type" electrical circuit is used to detect such small changes in the steady-state voltage or current due to the co-transport of glucose molecules and $Na^+$ ions.

In the fifth series of example, there is provided a device E where an actuator made of an Electro-Active-Polymer (EAP) is positioned in-between the two half-cells of a $H^+$ dependant fuel cell.

This yields a "fuel muscle", by combining decrease of pH utilising one of the previously described mechanisms, a redox couple such as the one we use in the "glucose fuel cell", for instance Quinhydrone, and an EAP.

Establishing electric contact through the appropriate resistance will result in flexion of the EAP.

It may be necessary to serially associate several "pH dependant fuel cells", in order to get the required voltage to operate EAP.

In the sixth series of example, there is provided a device F which simulates a kidney.

To this end there is provided several of the previous devices sequentially organized, in order to progressively move from an input fluid to an ouput fluid enriched in urea, thanks to successive creation of osmotic gradients and passive urea movements.

The invention claimed is:

1. A fuel cell comprising two distinct chambers, said fuel cell comprising
   (a) a casing,
   (b) a biomimetic artificial membrane comprising three distinct membrane layers:
      (i) a lipid membrane having a thickness of less than 20 nanometers, said lipid membrane comprising a plurality of lipid molecules arranged in a bilayer and at least a $Na^+/H^+$ transporter protein for creation of a gradient of pH over the membrane due to the gradient of $Na^+$;
      (ii) a supporting semi-permeable membrane for supporting the lipid membrane, the supporting polymer semi-permeable membrane having a thickness of less than 100 nanometers and being freely permeable to ions and molecules that are transported by the $Na^+/H^+$ transporter protein of the lipid membrane; and
      (iii) a polyelectrolyte membrane interposed between the supporting semi-permeable membrane and the lipid membrane, said polyelectrolyte membrane being configured to maximize adhesion to the lipid membrane while allowing lower viscosity and better lateral diffusion capability relative to the supporting membrane,
   said biomimetic artificial membrane being arranged within the casing to form said two distinct chambers, wherein the walls of the chambers are made of silicon, a portion of which is porous silicon, wherein the chambers have a volume of less than one cubic centimeter, and wherein each chamber is provided for enclosing a liquid of a given composition, wherein one of said liquids comprises NaCl without any enzyme for creating a gradient of $Na^+$ over said biomimetic artificial membrane as a source of power for the fuel cell,
   (c) means for transforming said gradient of pH into electrical energy, and
   (d) electrodes arranged on both sides of the lipid membrane.

2. The fuel cell of claim 1, wherein the lipid membrane further comprises a $Na^+/K^+$ exchanger.

3. The fuel cell of claim 1, wherein the supporting semi-permeable membrane is permeable to any ions and/or molecules of the liquid compositions.

4. The fuel cell of claim 1, wherein the supporting semi-permeable membrane is a porous polymer, silicon or graphene membrane.

5. The fuel cell of claim 1, wherein each chamber comprises an inlet for filling of the chamber with the liquid of the given composition.

6. The fuel cell of claim 1, wherein each chamber comprises an outlet for evacuating the liquid out of the chamber.

7. The fuel cell device of claim 1, wherein the supporting semi-permeable membrane has a thickness less than 20 nm.

8. The fuel cell of claim 1, wherein said means for transforming said gradient into electrical energy is selected to provide a salt fuel cell, a glucose fuel cell, or a fuel cell utilizing pH differential.

9. A fuel cell comprising a casing and a biomimetic artificial membrane arranged within the casing to form two distinct chambers, wherein
   the walls of the chambers are made of silicon, a portion of which is porous silicon, wherein the chambers have a volume of less than one cubic centimeter, and wherein each chamber is provided for enclosing a liquid of a given composition,
   the biomimetic artificial membrane comprises three distinct membrane layers:
      (i) a lipid membrane having a thickness of less than 20 nanometers, said lipid membrane comprising a plurality of lipid molecules arranged in a bilayer;
      (ii) a supporting semi-permeable membrane for supporting the lipid membrane, the supporting semi-permeable membrane having a thickness of less than 100 nanometers; and
      (iii) a polyelectrolyte membrane interposed between the supporting semi-permeable membrane and the lipid membrane, said polyelectrolyte membrane being configured to maximize adhesion to the lipid membrane while allowing lower viscosity and better lateral diffusion capability relative to the supporting membrane,
   the fuel cell fuel is NaCl,
   one of said liquids comprises said NaCl in order to create a gradient of Na+ over the biomimetic artificial membrane,
   the lipid membrane includes at least a $Na^+/H^+$ transporter protein for creation of a gradient of pH over the biomimetic artificial membrane due the gradient of $Na^+$ and the supporting polymer semi-permeable membrane is freely permeable to ions and molecules that are transported by the $Na^+/H^+$ transporter protein of the lipid membrane, and
   the fuel cell further comprises means for transforming said gradient of pH into electrical energy and electrodes arranged on both sides of the lipid membrane.

10. A fuel cell implantable inside a living organism, comprising a casing and a biomimetic artificial membrane arranged within the casing to form two distinct chambers, wherein
   the walls of the chambers are made of silicon, a portion of which is porous silicon, wherein the chambers have a volume of less than one cubic centimeter, and wherein each chamber is provided for enclosing a liquid of a given composition,
   the biomimetic artificial membrane comprises three distinct membrane layers:
      (i) a lipid membrane having a thickness of less than 20 nanometers, said lipid membrane comprising a plurality of lipid molecules arranged in a bilayer;
      (ii) a supporting semi-permeable membrane for supporting the lipid membrane, the supporting semi-permeable membrane having a thickness of less than 100 nanometers; and
      (iii) a polyelectrolyte membrane interposed between the supporting semi-permeable membrane and the lipid membrane, said polyelectrolyte membrane being configured to maximize adhesion to the lipid membrane while allowing lower viscosity and better lateral diffusion capability relative to the supporting membrane, the fuel cell fuel is Extra Cellular Fluid, said Extra Cellular Fluid being present within one of the chambers in order to create a gradient of Na+ over the biomimetic artificial membrane, the lipid membrane includes at least a $Na^+/H^+$ transporter protein for creation of a gradient of pH over the biomimetic artificial membrane due the gradient of $Na^+$ and the supporting polymer semi-permeable membrane is freely permeable to ions and molecules that are transported by the $Na^+/H^+$ transporter protein of the lipid membrane, and the fuel cell further comprises means for transforming said gradient of pH into electrical energy and electrodes arranged on both sides of the lipid membrane.

* * * * *